United States Patent [19]
Polan

[11] Patent Number: 5,602,553
[45] Date of Patent: Feb. 11, 1997

[54] RADIO CONTROLLED SERVO EXTENDER METHOD AND SYSTEM

[76] Inventor: Walter S. Polan, 1146 N. Central Ave., Suite 231, Glendale, Calif. 91202

[21] Appl. No.: 523,079

[22] Filed: Sep. 1, 1995

[51] Int. Cl.$^6$ .................................................. G08C 19/12
[52] U.S. Cl. ........................... 341/173; 341/176; 341/182; 341/178; 318/599
[58] Field of Search ...................................... 341/176, 173, 341/182, 178; 318/599, 596, 672, 615, 16; 340/825.63, 825.69, 825.72; 388/829

[56] References Cited

U.S. PATENT DOCUMENTS

| | | | |
|---|---|---|---|
| 4,295,082 | 10/1981 | Moto | 318/599 |
| 4,424,470 | 1/1984 | Finch | 318/6 |
| 4,703,241 | 10/1987 | Suzuki | 318/599 |
| 4,916,446 | 4/1990 | Yamamoto | 340/825.57 |
| 5,150,027 | 9/1992 | Suzuki | 318/599 |

*Primary Examiner*—Thomas Mullen
*Assistant Examiner*—Albert Wong
*Attorney, Agent, or Firm*—Charles I. Brodsky

[57] ABSTRACT

A control system is disclosed to extend the range of rotation of a radio-controlled servo towards its physical limits. A microprocessor and its various interconnections are inserted between the output of a radio control receiver and the input to the servomotor to analyze the output of the receiver and to re-scale it to allow movement beyond 45 degrees in either direction from its quiescent position. As described, this is done by converting the receiver output pulse from one which is 1 to 2 milliseconds in width to an output pulse for the servo which is 0.5 to 2.5 milliseconds in width.

7 Claims, 4 Drawing Sheets

(a)          (b)

IN          OUT

RADIO CONTROLLED SERVO EXTENDER METHOD AND SYSTEM

FIELD OF THE INVENTION

This invention relates to radio-controlled servomotors and, more particularly, to the modification of the output signal from the radio control receiver in a way to extend the possible rotation of the servomotor, towards that determined by its own physical limits.

BACKGROUND OF THE INVENTION

As is well known, the entertainment industry is increasingly using small models and puppets in the area of special effects. To make these miniatures appear lifelike, it is often required that they be able to exhibit movement. To facilitate this, servomotors ("servos") are employed, which can range in size from 1-½ inches square to 12 inches square and cost between $50.00 and $500.00 each.

It is often desirable to have these servos radio-controlled for aesthetic reasons (invisible to the camera), for portability, and to allow the puppeteer to move about freely. In these instances, a combination consisting of a transmitter, a receiver, and a servo are employed—which can be purchased as a pre-bundled set in a multiplicity of configurations (2 channel, 4 channel, or 8 channel). In addition, servos can be purchased separately, as the quantity of them and sizes are dictated by the space available in which they are to go, and by the amount of movement needed for the miniature to appear realistic.

Radio-controlled servos are generally used by hobbyists in model planes, cars, and boats, and the transmitters/receivers are designed with that in mind. As is understood, the requirements of a steering mechanism for them is that the operation be linear in order that the movement of the joystick or wheel on the transmitter and the resulting response it produces remains the same over the entire range of control. Manufacturers, knowing this prerequisite, design their radio-controlled receivers to output a current with a pulse-width of between 1 and 2 milliseconds, which translates into a range of motion from 45 degrees left of the servo's quiescent state (at 1 millisecond pulse width), to 45 degrees right of the servo's quiescent state (2 millisecond pulse width). This thus results in a 90 degree rotation limitation, imposed, because servos become very significantly nonlinear in operation when they exceed 45 degrees rotation to either side of quiescence.

Technicians in the special effects industry often have occasions, however, where more than 90 degrees of rotation would be desirable—and have recognized that the servos themselves have a physical limit of rotation far in excess of 90 degrees (for example, the Futaba FPS 148 servo has a range of approximately 80 degrees left of quiescence and approximately 110 degrees right of quiescence for a total range of 190 degrees). But, due to the limitation of the typical radio-control, those extra degrees of rotation are possible only by a hard-wired servo driver card. On those occasions where hard-wiring is not acceptable, special effects technicians who need the extra movement generally achieve it by extending the arm of the servo to travel a further distance, although the servo does not rotate any further than the permitted 45 degrees in either direction. This method of obtaining additional movement has proven, unacceptable for four reasons; first, extending the arm of the servo takes up additional space which may not be available in smaller miniatures; second, every time the length of the servo's arm is doubled, there is a halving of the torque; thirdly, there is an increased probability of servo burnout, requiring replacement at a cost of $50.00 to $500.00; and fourthly, if a servo burns out, the miniature has to be taken apart for the servo to be removed and replaced, which frequently causes a significant amount of production down time—which, itself can cost thousands of dollars in overruns.

OBJECTS OF THE INVENTION

It is an object of the present invention, therefore, to provide a new and improved manner of permitting a servo to rotate more than 45 degrees to either side of quiescence when radio-controlled.

It is another object of the invention to accomplish this in a way which avoids the problems associated with prior art attempts to meet this objective.

SUMMARY OF THE INVENTION

As will become clear from the following, a servo range extender according to the invention includes a microprocessor and its various interconnects which is inserted between the output of a radio-controlled receiver and the input to the servo to allow a greater range of motion than is permissible otherwise. As will become clear from the description, the output signal of the receiver is analyzed by a program running on the microprocessor and fed through an algorithm which modifies an input pulse ranging from 1 to 2 milliseconds in width to an output pulse of 0.5 to 2.5 milliseconds wide—and more specifically according to a formula $PW_{out} = (PW_{in} - 100\mu s) \times 2, +0.5$ where $PW_{in}$ & $PW_{out}$ represent the pulse width in and pulse width out in milliseconds, respectively. As will additionally be seen, the program also serves to reduce undesired servo chatter caused by any noise interference that might be present.

BRIEF DESCRIPTION OF THE DRAWING

These and other features of the invention will be more clearly understood from a consideration of the following description, taken in connection with the accompanying drawing in which.

DETAILED DESCRIPTION OF THE DRAWING

Figure 1:
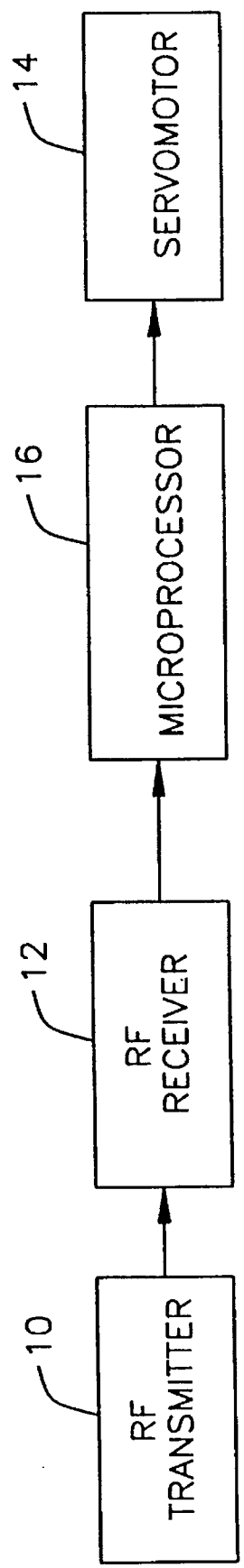
FIG. 1 is a block diagram of a system for extending the range of a radio-controlled servomotor according to the invention.
Figure 2:
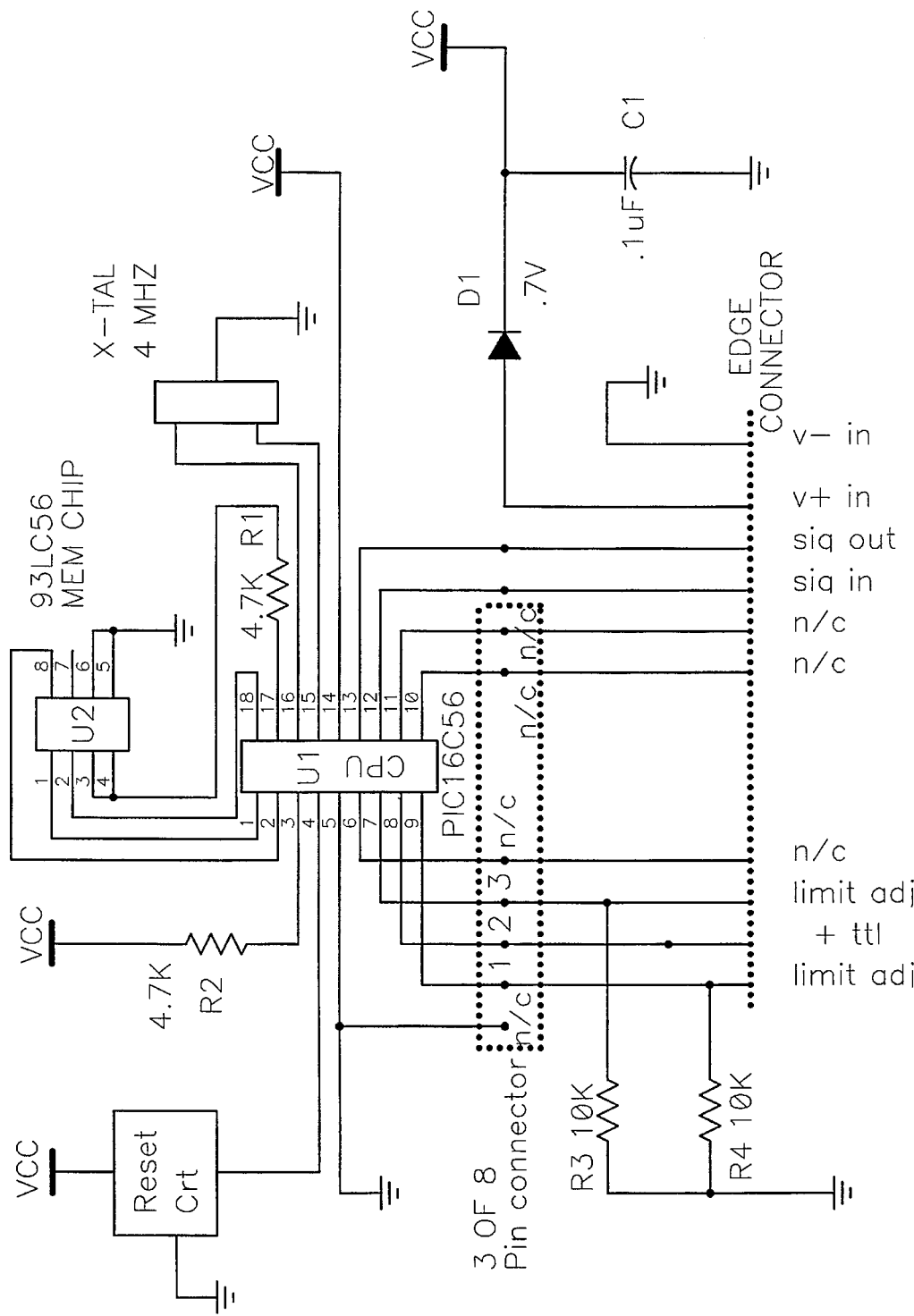
FIG. 2 is a block diagram representation of a microprocessor employed in the system of FIG. 1.

Referring to FIG. 1, a block diagram of a typical radio-controlled servomotor system as employed for creating special effects in the entertainment industry includes a radio-frequency transmitter 10, a receiver 12 and instead of coupling the output of the receiver 12 directly as an input to the servomotor 14, a microprocessor 16 constructed according to the teachings of the invention 16 is included in the signal path between the receiver 12 and the servomotor 14. Such a microprocessor 16 as employed in one construction of the invention is shown in FIG. 2 as operating with a 4 MHZ crystal with conventionally available integrated circuits such as the PIC 16C56-XT and 93LC56 as manufactured by Microchip, Inc.

In operating the system of FIG. 1—and in general, providing a method for extending the range of the servomotor 14—; the microprocessor operates in accordance with a computer program to re-scale the radio-frequency signal received to one for controlling the servomotor 14 in accordance with a formula $$PW_{out}=(PW_{in}-100\mu s)\times 2,+0.5$$

Where $PW_{in}$ and $PW_{out}$ represent the input pulse width to the microprocessor 16 and its output pulse width, measured in milliseconds, respectively.

Figure 3:
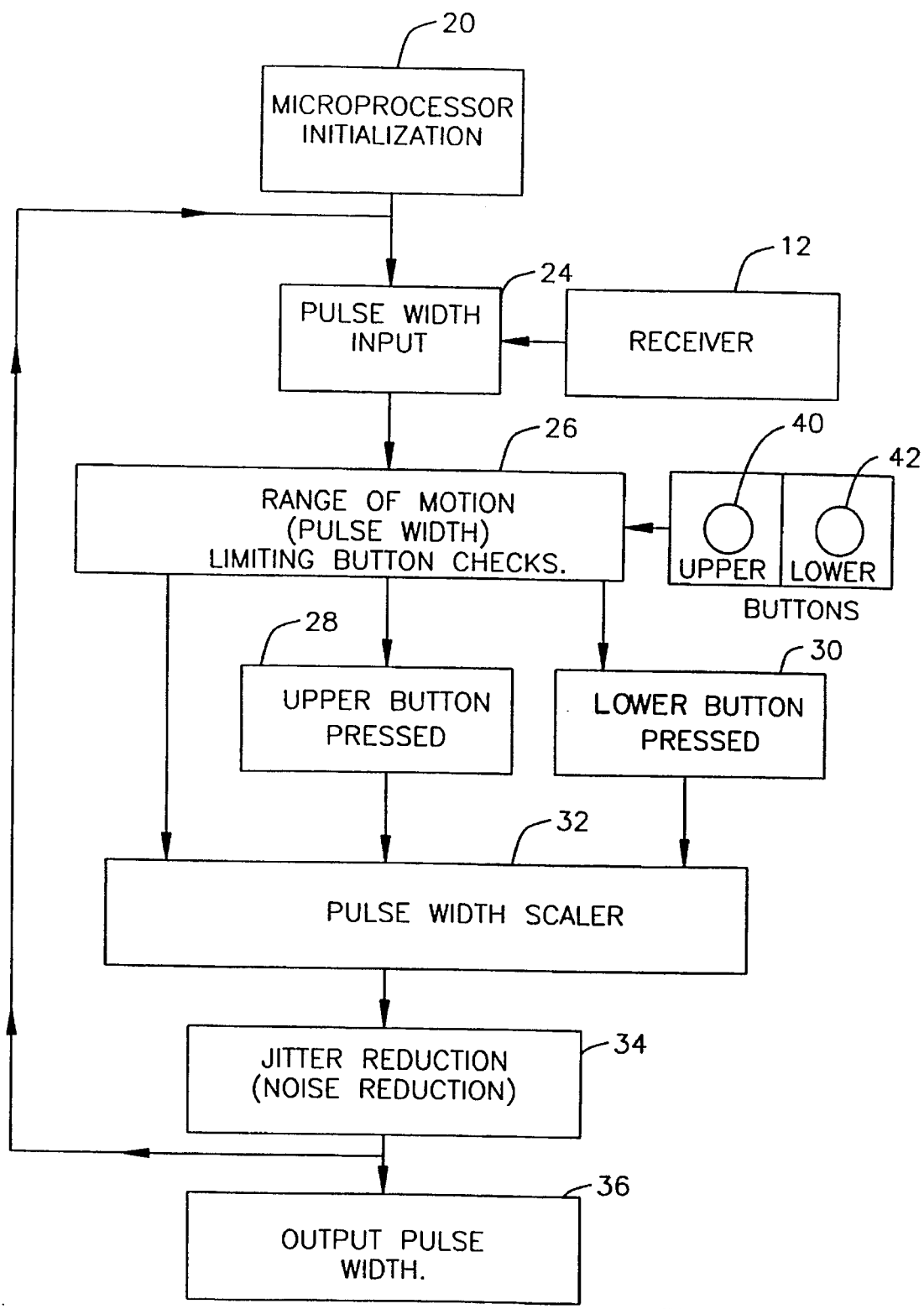
FIG. 3 is a flow chart which shows the logic of a computer program which implements the preferred embodiment of the invention.

The listing of the program for the microprocessor 16 appears at the end of the specification as an appendix, and is written in a format understandable to those of ordinary skill in the art. Such program, and the part it plays in the method and system of the invention for extending the range of the radio-controlled servomotor can, however, be understood from the flow chart of FIG. 3.

Thus, when power is turned on, there is an initialization in the microprocessor module 20 to set the various pins of the microprocessor 16 in defining the input and output terminals and where it also reads the values stored from the electrically erasable programmable read only memory (EEPROM) especially as for an upper/lower limit button to be defined below. Such limits establish the range of motion for the servo, as the number of degrees of rotation from either side of the quiescent center, as stored in memory from the last time the button was pressed.

Figure 4:
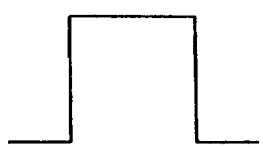
FIGS. 4a and 4b show a series of signals of variable pulse width helpful in an understanding of the invention.
Figure 4:
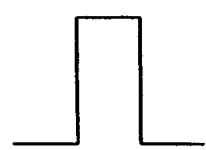
Figure 4:
Figure 4:
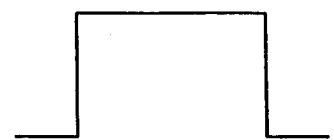
Figure 4:
Figure 4:
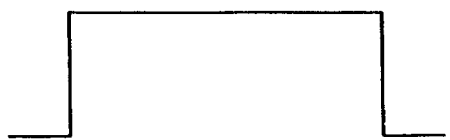

The signal detected by the receiver 12 is then applied to the pulse width input module 24 which converts it, when present, to a pulse width of given voltage—and, with the usual radio-frequency controlled transmitter for servomotor operation, to a pulse width of between 1 and 2 milliseconds. (FIG. 4a) In particular, such a pulse generally defines a servo rotation to the left of quiescence of 45° for a pulse width of 1 millisecond, and 45° to the right of quiescence for a pulse width of 2 milliseconds. As will be appreciated by those skilled in the art, if no signal pulse is detected from the receiver 22, the pulse width input module 24 continues checking for one, until such a signal is detected. Once a signal is received, on the other hand, the range of motion limiting buttons check module 26 comes into play.

Essentially, such a module 26 is an alternative option which couples to the microprocessor, and comprises a pair of buttons that set a limit of the range of motion that the servo is to rotate through. The module 26 thus looks to see if either button is depressed, as where the upper range of motion for the servo may be limited to the right of quiescence some 15° for example, and with the lower range of motion being limited to 90° to the left of center quiescence, as an illustration. If neither the upper limit button 28 is depressed, or the lower limit button 30, the range of motion limit module 26 then translates the signal from the pulse width input module 24 directly to the pulse width scaler 32. If, however, either the upper limit button 40, or the lower limit button 42 is actuated, then the output from the range of motion limiting module 26 is coupled through to the pulse width scaler 32 via the appropriate button module 28 or 30. In accordance with the program set forth in the appendix, if either the upper limit button 40 or the lower limit button 42 is depressed, the current value of the pulse width is temporarily stored as representing the upper or lower extreme of servo rotation. In a similar manner, control is effectuated as to the pulse width which is translated to the scaler 32. Once either limit button 40 or 42 is released, then the current pulse width is written into the electrically erasable programmable read only memory (EEPROM), to set the upper and lower limits of the servo motion, respectively. Upon then shutting down the remote control receiver, such pulse width limits are stored in the memory to be reestablished once the system is later turned on.

In the pulse width scaler 32, the incoming pulse is first analyzed as to width to determine whether it is within the range of pulse widths established by the upper/lower limit buttons modules 28 and 30. Any pulse width beyond the upper or lower limited pulse widths is ignored and the pulse widths present are limited to that set by the button controls 28, 30. In the pulse width scaler, moreover, the input pulse width is modified, and specifically, in accordance with a formula $$PW_{out}=(PW_{in}-100 \mu s)\times 2,+0.5$$

$PW_{in}$ and $PW_{out}$ represent the input pulse width to the scaler 32, and the output pulse width therefrom, in milliseconds, respectively. Thus, And as will be understood from FIGS. 4a & 4b, the scaler 32 converts an input pulse width of 1 millisecond to an output pulse width of 0.5 milliseconds; converts an input pulse width of 2 milliseconds to an output pulse width of 2.5 milliseconds; provides an output pulse width of 1.5 milliseconds when the input pulse width is the same 1.5 milliseconds, and everything in between. As will be seen, a pulse width received from the radio frequency transmitter of 1 millisecond width where the upper and lower limit are set to their maximum range is then extended to an output pulse of from 0.5 milliseconds to 2.5 milliseconds, an effective doubling thereof, but with the same effective midpoint. As will be understood by those skilled in the art, the re-scaling is thus effective to extend by a factor of 2 in this manner the servo rotation from its quiescent point, while maintaining that quiescent point unchanged.

Further, in accordance with the invention, the output pulse from the scaler 32 is then coupled to a jitter or noise reduction module 34 to correct for any undesired movement of the servo due to an inability to hold the radio-frequency transmitter or its joystick or control wheel absolutely still. In the module 34, any pulse width detection in the nature of changes of less than 20 microseconds are ignored as just the result of this type of chatter. In accordance with the program in the appendix, the pulse width detected is averaged with the last one received in providing a smoother response, and seeing whether this 20 microsecond change is present or not. If the change noted is less than 20 microseconds, then the prior value, according to the program, is utilized. If, on the other hand, the change is greater than 20 microseconds from the previous value, then the new value is utilized and stored for comparison to subsequently received values. The output from the jitter reduction module 34 is then coupled to the output pulse width module 36, from which it is applied to the servomotor. As noted above, the end result is to translate a pulse width centered about 1.5 milliseconds from 1 millisecond to 2 milliseconds to another translated about the 1.5 millisecond quiescent midpoint, to between 0.5 milliseconds and 2.5 milliseconds. Where the previous pulse width of 1 millisecond to 2 milliseconds so centered in this manner produced a servo rotation of ±45 degrees from quiescence, the re-scaled pulse width will now be appreciated by those skilled in the art to produce a servo rotation of ±90 degrees, doubling the range of motion.

While there have been described what are considered to be preferred embodiments of the present invention, it would be readily appreciated by those skilled in the art that modifications can be made without departing from the scope of the teachings herein of re-scaling the pulse width received from a radio frequency controlled transmitter to one of greater range for extending the rotation of a servo about its quiescent position. While a particular formula has been set forth for effectively doubling the range, it will be understood that other formulas might be determined in accordance with a particular usage, also to provide an output signal of a variable pulse width falling within a second different range, but maintaining the same conditions necessary to keep the initial quiescent condition for the servo. In similar fashion, it will be appreciated that the identification of 45 degrees and 90 degrees rotations as set forth are nominal and may only approximate those values in any individual construction, the formula specified and the pulse widths called out are based thereon, and may vary somewhat in exactitude from situation-to-situation, although substantially precise. For at least such reason, therefore, resort should be had to the claims annexed hereto for a true understand of the scope of the invention.

APPENDIX

TABLE OF CONTENTS

1. Initialize Microprocessor
2. Pulse Width Input
3. Check Button
4. Scaler
5. Jitter reduction
6. Output Pulse
7. Upper Button
8. Lower Button

1. Initialize Microprocessor

| | |
|---|---|
| EEprom 1, (95,200) | First time power up limit settings. |
| PINS=0 | Shut off all I/O pins. |
| DIRS=%00000000 | Set all I/O pins to inputs |
| HIGH 2 | Make Pin #2 an output and set HI |
| Read 1,B6 | Read last Low limit (LB) from EEprom to memory location B6. |
| Read 2,B5 | Read last Upper limit (UB) from EEprom to memory location B5. |
| START: | |
| GOSUB MAIN: | |
| GOTO START: | Start Over |

2. Pulse Width Input

| | |
|---|---|
| MAIN: | |
| PULSIN 5,1,B0 | Read in pulse from pin 5 (R/C Receiver) start counting on "HI" edge. |
| IF B0 = 0 THEN MAIN: | If no pulse try again |

3. Check Button

| | |
|---|---|
| IF B8=1 THEN UB: | If in process of setting Upper limit goto "UB". |
| IF B9=1 THEN LB: | If in process of setting Lower limit goto "LB". |
| B7=0 | Reset button work space. |
| BUTTON 1,1,0,0,B7,1,UB: | Check to see if Upper set button is pushed. |
| B7=0 | Reset button work space. |
| BUTTON 3,1,0,0,B7,1,LB: | Check to see if Lower set button is pushed. |
| CONTINUE: | |

4. Scaler

| | |
|---|---|
| B4=B0 MIN B6 | Set Inputted Pulse to no less than Lower limit |
| B4=B4 MAX B5 | Set Inputted Pulse to no more than Upper limit |
| B3=B4-100*2+50+B2/2 | 1) B4-100 rescales pulse by removing center point (before 95 to 200, after −5 to 100 µs) |
| | 2) *2 doubles gain of pulse |
| | 3) +50 Put back canter point of rotation range |
| | 4) B2/2 average with last position |

5. Jitter Reduction

| | |
|---|---|
| B1=B3−B2+1 | Checks to see if the input changed by 2 microseconds |
| If B1>0 then out; | If not greater than 2 microseconds use prior output |
| B3=B2 | |
| OUT: | |

6. Output Pulse

| | |
|---|---|
| PULSEOUT 4,B3 | Send new pulse out to servomotor |
| B2=B3 | Save new pulse as last pulse (B@) |
| RETURN: | Start over or return to range limit set. |

7. Upper Button

| | |
|---|---|
| UB: | |
| B9=1 | Indicate Upper limit set mode |
| B0=B0 MIN 150 | Temporarily set limit to top half of range. |
| B5=B0 MAX 200 | |
| GOSUB CONTINUE: | Sends result through Jitter reduction and outputs it |
| B7=0 | Reset Button work space. |
| BUTTON 3,1,0,0,B7,1,MAIN: | If button still pushed goto MAIN |
| B9=0 | Indicate no longer limit set mode. |
| Write 2, B5 | Write New Setting to Eeprom. |
| GOTO CONTINUE: | |

8. Lower Button

| | |
|---|---|
| LB: | |
| B8=1 | Indicate Upper limit set mode |
| B0=B0 MAX 140 | Temporarily set limit to bottom half of range. |
| B5=B0 MIN 95 | |
| GOSUB CONTINUE: | Sends result through Jitter reduction and outputs it |
| B7=0 | Reset Button work space. |
| BUTTON 1,1,0,0.B7,1,MAIN: | If button still pushed goto MAIN |
| B8=0 | Indicate no longer limit set mode. |
| Write 1, B6 | Write New Setting to Eeprom. |
| GOTO CONTINUE: | |
| END | |

I claim:

1. A method for extending the range of a radio-controlled servomotor comprising the steps of:

a) transmitting a radio frequency signal defining desired servomotor rotation to the left and right of an initial quiescent condition, said signal being of a variable pulse width falling within a first range of available pulse widths, and including a predetermined pulse width in said first range which establishes said initial quiescent condition;

b) receiving said radio frequency signal;

c) processing said received signal to provide an output signal of a variable pulse width falling within a second range of pulse widths, different from said first range of pulse widths, but maintaining said same predetermined pulse width to establish said same initial quiescent condition for said servomotor; and d) inputting said output signal to said servomotor to control the rotation thereof.

2. The method of claim 1 wherein said first step transmits a radio frequency signal of between approximately 1 milliseconds and 2 milliseconds pulse width.

3. The method of claim 2 wherein said third step processes said received signal to an output signal approximately 0.5 milliseconds to 2.5 milliseconds pulse width.

4. The method of claim 3 wherein both said transmitted signal and an output signal of approximately 1.5 milliseconds pulse width establish said initial quiescent condition for said servomotor.

5. The method of claim 1 wherein said third step processes said received signal to provide an output signal according to the formula $PW_{out}=(PW_{in}-100 \mu s) \times 2,+0.5$, where $PW_{in}$ and $PW_{out}$ represent input pulse width and output pulse width in milliseconds, respectively.

6. The method of claim 1 wherein said third step processes said received signal to an output signal of a variable pulse width within a second range of pulse widths, greater than said first range of pulse widths, and wherein said fourth step inputs said output signal to said servomotor to increase the rotation thereof.

7. A system for extending the range of a servomotor comprising:

a) means for transmitting a radio frequency signal defining desired servomotor rotation to the left and right of an initial quiescent condition, said signal being of a variable pulse width falling within a first range of available pulse widths, and including a predetermined pulse width in said first range which establishes said initial quiescent condition;

b) means for receiving said radio frequency signal;

c) means for processing said received signal to provide an output signal of a variable pulse width falling within a second range of pulse widths, different from said first range of pulse widths, but maintaining said same initial quiescent condition for said servomotor; and d) means for inputting said output signal to said servomotor to control the rotation thereof.

* * * * *